United States Patent
Jenkins

[11] Patent Number: 5,881,494
[45] Date of Patent: Mar. 16, 1999

[54] INTEGRATED PEST CONTROL SYSTEM

[76] Inventor: Donnell Theron Jenkins, 705 Kemp Dr., Bishopville, S.C. 29010

[21] Appl. No.: 870,059

[22] Filed: Jun. 5, 1997

[51] Int. Cl.⁶ .................................................... A01M 7/00
[52] U.S. Cl. ............................................................ 43/124
[58] Field of Search .......................... 43/124; 239/428.5, 239/463, 487, 499

[56] References Cited

U.S. PATENT DOCUMENTS

| | | | |
|---|---|---|---|
| 1,340,136 | 5/1920 | Murphy | 239/463 |
| 1,380,834 | 6/1921 | Parker | 239/463 |
| 1,795,488 | 3/1931 | Hill | 43/124 |
| 2,218,110 | 10/1940 | Hosmer et al. | 239/463 |
| 2,526,220 | 10/1950 | Goddard | 239/406 |
| 2,569,081 | 9/1951 | Veach | 239/472 |
| 2,644,720 | 7/1953 | Carr | 239/379 |
| 2,998,934 | 9/1961 | Broughton | 239/521 |
| 3,151,746 | 10/1964 | Reustle et al. | 43/124 |
| 3,676,949 | 7/1972 | Ramsey | 43/124 |
| 3,843,056 | 10/1974 | Nye | 239/64 |
| 4,028,841 | 6/1977 | Lundwall | 43/124 |
| 4,695,225 | 9/1987 | Hellat et al. | 239/486 |
| 4,742,641 | 5/1988 | Cretti | 43/124 |
| 5,154,356 | 10/1992 | Sorenson | 239/550 |

*Primary Examiner*—Michael J. Carone
*Assistant Examiner*—Darren Ark

[57] ABSTRACT

A pest control system for integrating into a building structure for providing a strong and reliable defense against pests for building structures which is convenient to utilize. The inventive device includes a plurality of pipes interconnected throughout the walls of the building structure, a plurality of dispensing nozzles connected along the pipes, and a pump connected to the pipes for forcing a chemical throughout the pipes and out the nozzles.

13 Claims, 4 Drawing Sheets

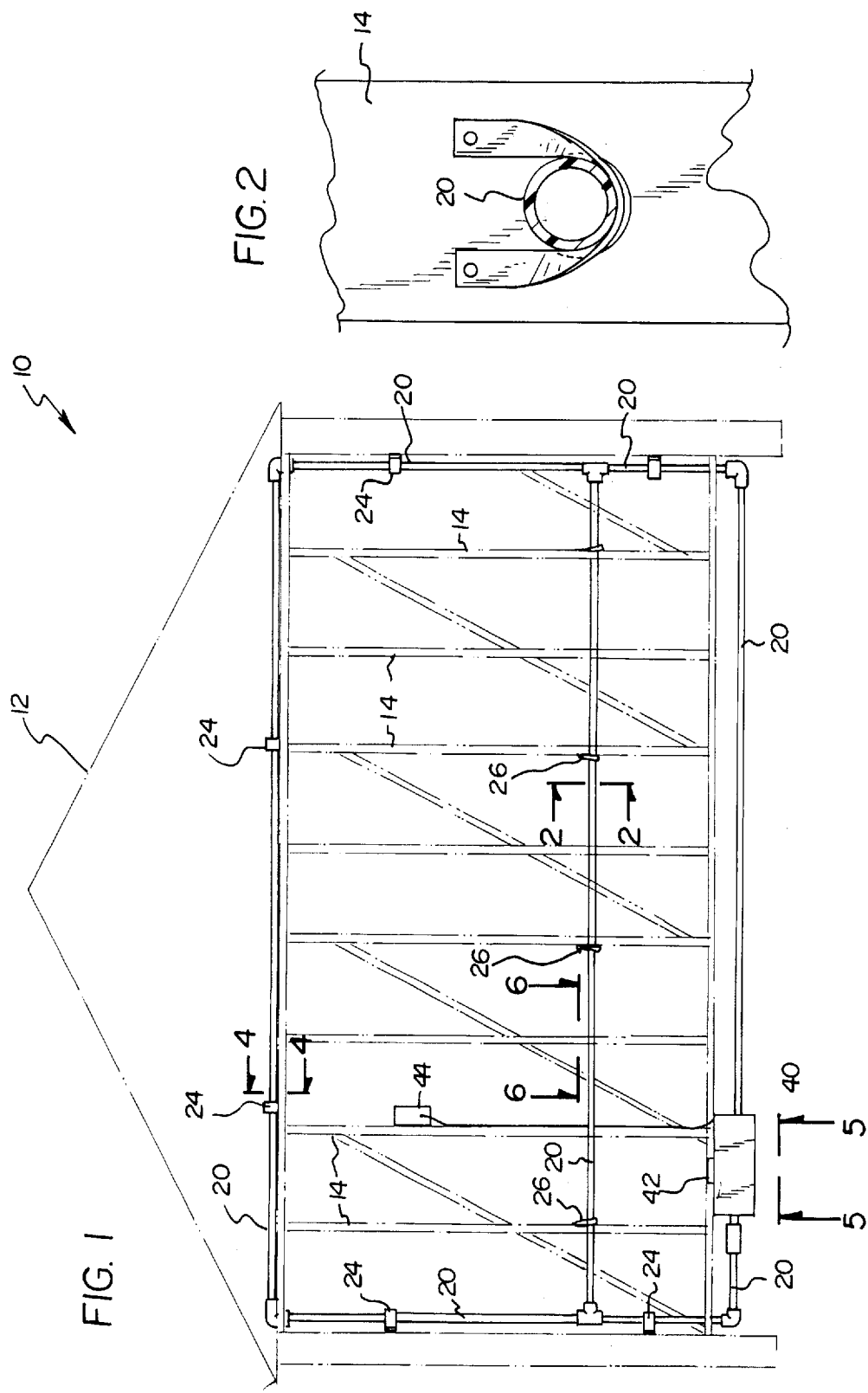

INTEGRATED PEST CONTROL SYSTEM

BACKGROUND OF THE INVENTION

1. Field of the Invention

The present invention relates to Exterminating Devices and more particularly pertains to a new Integrated Pest Control System for providing a strong and reliable defense against pests for building structures which is convenient to utilize.

2. Description of the Prior Art

The use of Exterminating Devices is known in the prior art. More specifically, Exterminating Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Exterminating Devices include U.S. Pat. No. 5,231,796; U.S. Pat. No. 4,893,434; U.S. Pat. No. 5,347,749; U.S. Pat. No. 5,309,669; U.S. Pat. No. 5,359,806 and U.S. Pat. No. 5,063,706.

While these devices fulfill their respective, particular objectives and requirements, the aforementioned patents do not disclose a new Integrated Pest Control System. The inventive device includes a plurality of pipes interconnected throughout the walls of the building structure, a plurality of dispensing nozzles connected along the pipes, and a pump connected to the pipes for forcing a chemical throughout the pipes and out the nozzles.

In these respects, the Integrated Pest Control System according to the present invention substantially departs from the conventional concepts and designs of the prior art, and in so doing provides an apparatus primarily developed for the purpose of providing a strong and reliable defense against pests for building structures which is convenient to utilize.

SUMMARY OF THE INVENTION

In view of the foregoing disadvantages inherent in the known types of Exterminating Devices now present in the prior art, the present invention provides a new Integrated Pest Control System construction wherein the same can be utilized for providing a strong and reliable defense against pests for building structures which is convenient to utilize.

The general purpose of the present invention, which will be described subsequently in greater detail, is to provide a new Integrated Pest Control System apparatus and method which has many of the advantages of the Exterminating Devices mentioned heretofore and many novel features that result in a new Integrated Pest Control System which is not anticipated, rendered obvious, suggested, or even implied by any of the prior art Exterminating Devices, either alone or in any combination thereof.

To attain this, the present invention generally comprises a plurality of pipes interconnected throughout the walls of the building structure, a plurality of dispensing nozzles connected along the pipes, and a pump connected to the pipes for forcing a chemical throughout the pipes and out the nozzles.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Integrated Pest Control System apparatus and method which has many of the advantages of the Exterminating Devices mentioned heretofore and many novel features that result in a new Integrated Pest Control System which is not anticipated, rendered obvious, suggested, or even implied by any of the prior art Exterminating Devices, either alone or in any combination thereof.

It is another object of the present invention to provide a new Integrated Pest Control System which may be easily and efficiently manufactured and marketed.

It is a further object of the present invention to provide a new Integrated Pest Control System which is of a durable and reliable construction.

An even further object of the present invention is to provide a new Integrated Pest Control System which is susceptible of a low cost of manufacture with regard to both materials and labor, and which accordingly is then susceptible of low prices of sale to the consuming public, thereby making such Integrated Pest Control System economically available to the buying public.

Still yet another object of the present invention is to provide a new Integrated Pest Control System which provides in the apparatuses and methods of the prior art some of the advantages thereof, while simultaneously overcoming some of the disadvantages normally associated therewith.

Still another object of the present invention is to provide a new Integrated Pest Control System for providing a strong and reliable defense against pests for building structures which is convenient to utilize.

Yet another object of the present invention is to provide a new Integrated Pest Control System which includes a plurality of pipes interconnected throughout the walls of the building structure, a plurality of dispensing nozzles connected along the pipes, and a pump connected to the pipes for forcing a chemical throughout the pipes and out the nozzles.

Still yet another object of the present invention is to provide a new Integrated Pest Control System that dispenses a pesticide throughout the interior portion of the walls of the building structure to exterminate undesirable pests.

Even still another object of the present invention is to provide a new Integrated Pest Control System that is positioned within the walls of the building structure where pests live and breed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new Integrated Pest Control System according to the present invention.

FIG. 2 is a cross sectional view taken along line 2—2 of FIG. 1.

DESCRIPTION OF THE PREFERRED EMBODIMENT

Figure 3:
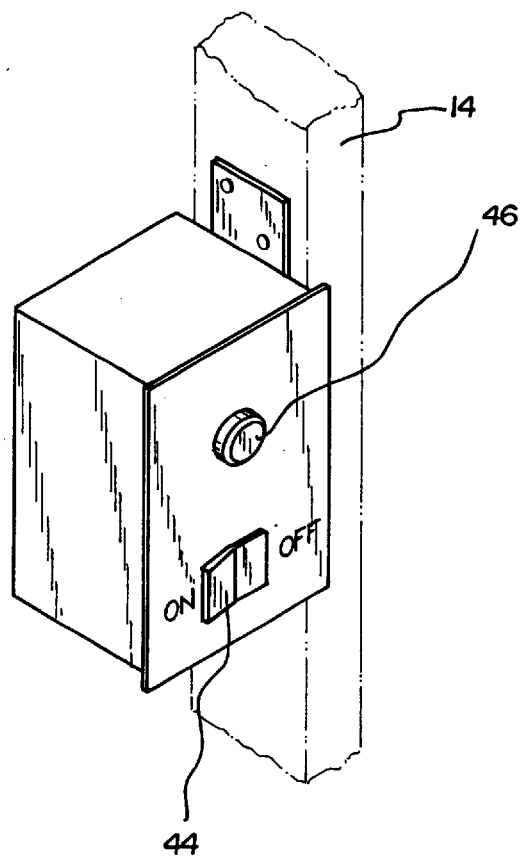
FIG. 3 is an upper perspective view of the control switch and indicator light.

With reference now to the drawings, and in particular to FIGS. 1 through 9 thereof, a new Integrated Pest Control System embodying the principles and concepts of the present invention and generally designated by the reference numeral 10 will be described.

Figure 7:
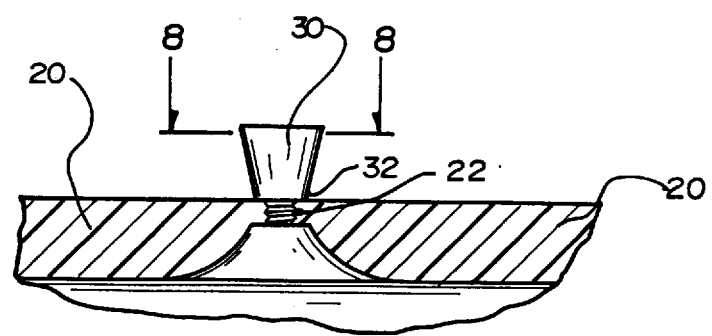
FIG. 7 is a cross sectional view taken along line 7—7 of FIG. 6.
Figure 9:
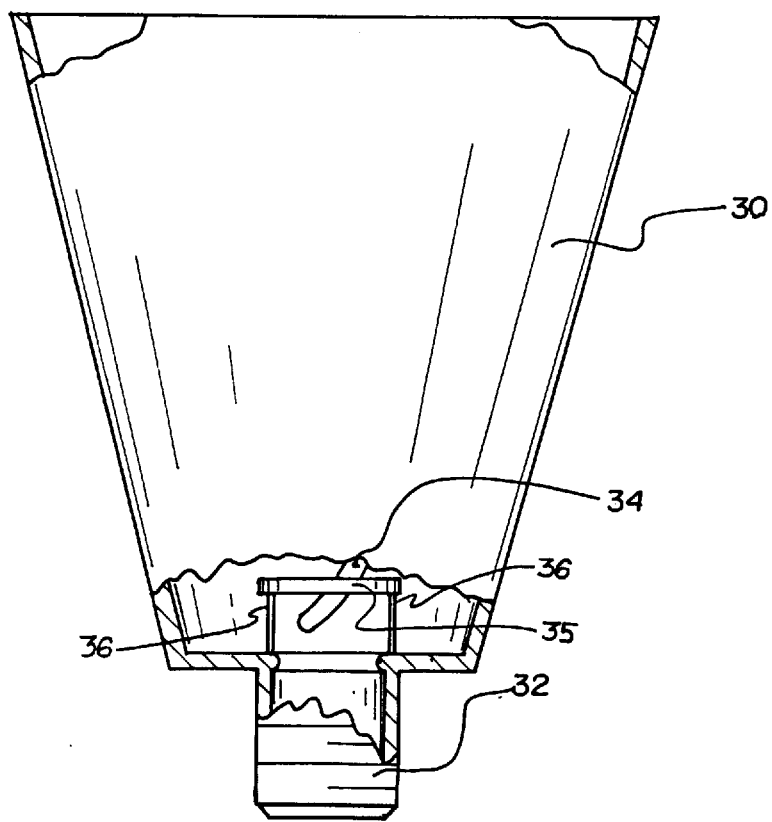
FIG. 9 is a side cut-away view of the dispensing nozzle.

More specifically, it will be noted that the Integrated Pest Control System 10 comprises a plurality of interconnected pipes 20 positionable within a plurality of walls of a building structure 12 as shown in FIG. 1. A plurality of apertures 22 project into the plurality of pipes 20. The plurality of apertures 22 are preferably threaded and threadably receive a corresponding plurality of dispensing nozzles 30 each having a threaded male end 32 as shown in FIGS. 7 and 9 of the drawings. A pump 40 is fluidly connected to the pipes 20 and is fluidly connected to a reservoir 42. The reservoir 42 contains a pesticide which the pump 40 draws from and dispenses through the pipes 20 out from the plurality of apertures 22 into an interior portion of the walls of the building structure 12.

Figure 8:
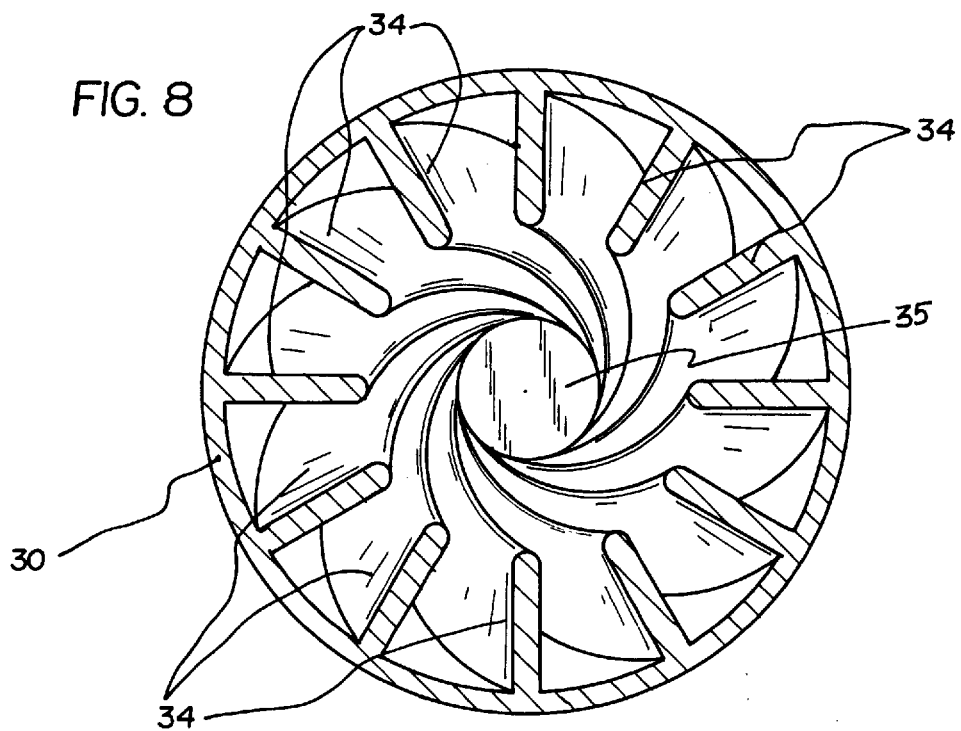
FIG. 8 is a cross sectional view taken along line 8—8 of FIG. 7.

As shown in FIGS. 7 and 9 of the drawings, the dispensing nozzles 30 are preferably conical shaped having an interior cavity. The dispensing nozzles 30 preferably have a plurality of swirled fins 34 secured within the interior cavity for uniformly dispensing the pesticide. The dispensing nozzles 30 each have a dispersion plate 35 for dispersing a fluid into the channels formed between adjacent swirled fins 34. The dispersion plate 35 is supported in a spaced apart relationship from an end of the nozzle proximal to the threaded male end 32 by at least two brace members 36 as shown in FIG. 9 and abuts an inner edge of each of the swirled fins 34 as shown in FIG. 8.

Figure 4:
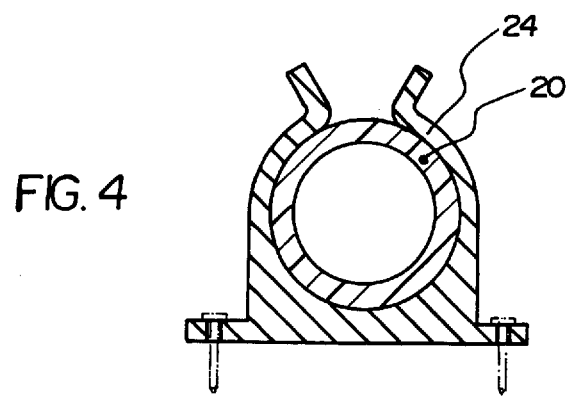
FIG. 4 is a cross sectional view taken along line 4—4 of FIG. 1.
Figure 5:
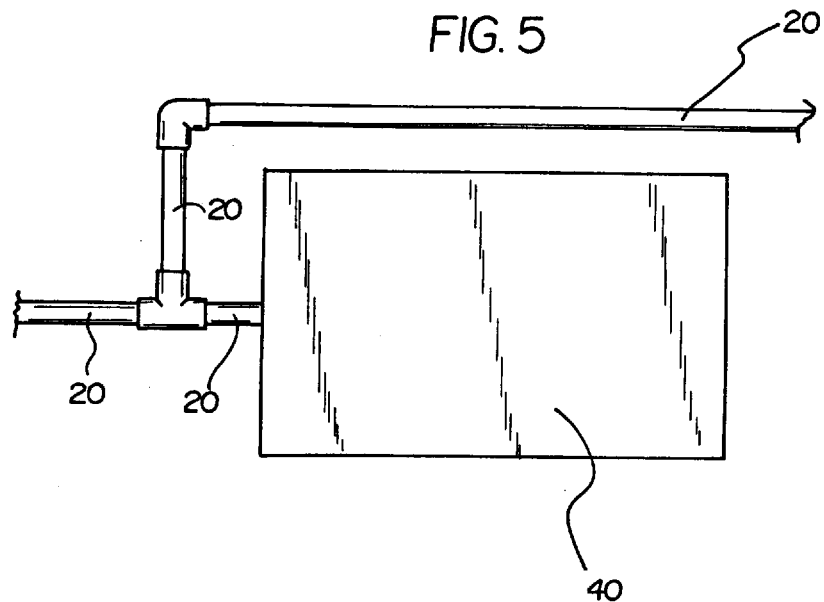
FIG. 5 is a cross sectional view taken along line 5—5 of FIG. 1.
Figure 6:
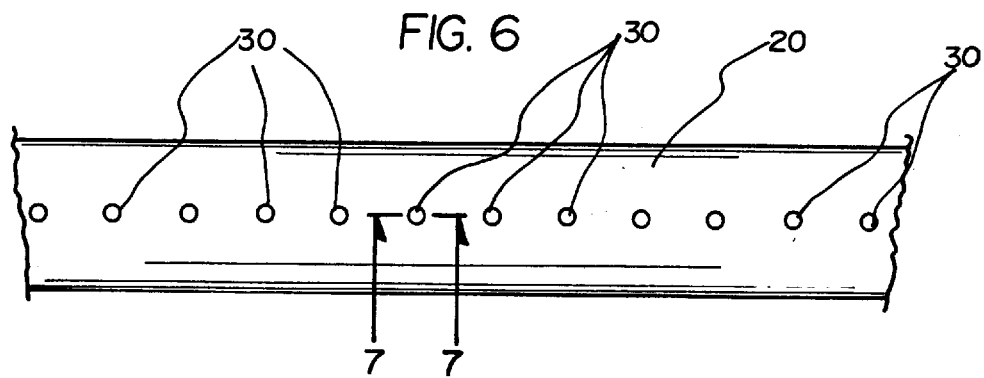
FIG. 6 is a cross sectional view taken along line 6—6 of FIG. 1.

As shown in FIGS. 1 and 4 of the drawings, a plurality of U-shaped clamps 24 are provided for engaging the pipes 20 to a stud 14 within the building structure 12. The U-shaped clamps 24 are preferably constructed from a resilient rubber for preventing excessive noise from the pipes 20. A plurality of U-shaped straps 26 are preferably provided for supporting the pipes 20 horizontally within the walls of the building structure 12 as shown in FIGS. 1 and 2 of the drawings.

As shown in FIGS. 1 and 3 of the drawings, a control switch 44 is electrically connected to the pump 40 and is secured to a stud 14 within the wall of the building structure 12 for controlling the pump 40. An indicator light 46 is preferably secured within the control switch 44 and electrically connected to the pump 40 for indicating when the pump 40 is in operation as shown in FIG. 3 of the drawings.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pest control system for integrating into a building structure comprising:

a plurality of interconnected pipes positionable within a plurality of walls of a building structure;

a plurality of apertures projecting into each of said plurality of pipes, said plurality of apertures being threaded and threadably receiving a corresponding plurality of dispensing nozzles;

each of said dispensing nozzles being generally conically shaped and having an inner surface defining an interior cavity, each of said nozzles having a proximal end and a distal end, each of said proximal ends having an aperture extending therethrough and a threaded male end extending therefrom for coupling with said plurality of apertures and having a lumen extending therethrough;

each of said dispensing nozzles including a plurality of spaced apart swirled fins extending inwardly from said inner surface into said interior cavity for uniformly dispensing a fluid passing from the proximal ends of the dispensing nozzles towards the distal ends of the dispensing nozzles, each of said swirled fins extending between said proximal and distal ends of said dispensing nozzles, a pair of adjacent fins forming a channel therebetween;

each of said dispensing nozzles having a dispersion plate being disposed therein in a spaced apart relationship from said proximal ends of said dispensing nozzles, said dispersion plates being adapted for dispersing a fluid into said channels formed by said swirled fins as the fluid passes from said proximal ends of said dispensing nozzles towards said distal ends of said dispensing nozzles; and a pump fluidly connected to said pipes and fluidly connected to a reservoir, wherein said reservoir contains a pesticide which said pump draws from and dispenses through said pipes out from said plurality of apertures into an interior portion of said walls of said building structure.

2. The pest control system of claim 1, wherein said dispersion plates of each of said dispensing nozzles abuts an inner edge of each of said swirled fins.

3. The pest control system of claim 1, wherein a gap is formed between each of said swirled fins and said proximal ends of said dispensing nozzles, said gaps being for permitting more equal apportionment of said fluid into said channels formed by said swirled fins.

4. The pest control system of claim 1, wherein the inner diameter of said aperture of said proximal end of each of said dispensing nozzles is smaller than the inner diameter of said lumen of each of said threaded male ends of said dispensing nozzles such that a lip is formed around each of said apertures for concentrating the flow of said fluid onto said dispersion plate.

5. The pest control system of claim 1, including a plurality of U-shaped clamps for engaging said pipes to a stud within said building structure.

6. The pest control system of claim 5, wherein said U-shaped clamps are comprised of a resilient rubber for preventing excessive noise from said pipes.

7. The pest control system of claim 1, including a plurality of U-shaped straps for supporting said pipes horizontally within said walls of said building structure.

8. The pest control system of claim 1, including a control switch electrically connected to said pump and secured to a stud within said walls of said building structure for controlling said pump.

9. The pest control system of claim 8, including an indicator light secured within said control switch and electrically connected to said pump for indicating when said pump is in operation.

10. The pest control system of claim 1, wherein each of said dispersion plates is supported in a spaced apart relationship from said proximal ends of said dispensing nozzles by at least two brace members.

11. The pest control system of claim 1, wherein the shape of each of said swirled fins along longitudinal axis of each of said swirled fins is generally arcuate.

12. A pest control system for integrating into a building structure comprising:

a plurality of interconnected pipes positionable within a plurality of walls of a building structure;

a plurality of apertures projecting into each of said plurality of pipes, said plurality of apertures being threaded and threadably receiving a corresponding plurality of dispensing nozzles;

each of said dispensing nozzles being generally conically shaped and having an inner surface defining an interior cavity, each of said nozzles having a proximal end and a distal end, each of said proximal ends having an aperture extending therethrough and a threaded male end extending therefrom for coupling with said plurality of apertures and having a lumen extending therethrough;

each of said dispensing nozzles including a plurality of spaced apart swirled fins extending inwardly from said inner surface into said interior cavity for uniformly dispensing a fluid passing from the proximal ends of the dispensing nozzles towards the distal ends of the dispensing nozzles, each of said swirled fins extending between said proximal and distal ends of said dispensing nozzles, the shape of each of said swirled fins along a longitudinal axis of each of said swirled fins being generally arcuate, a pair of adjacent fins forming a channel therebetween;

each of said dispensing nozzles having a dispersion plate being disposed therein in a spaced apart relationship from said proximal ends of said dispensing nozzles, said dispersion plates of each of said dispensing nozzles abutting an inner edge of each of said swirled fins for dispersing a fluid into said channels formed by said swirled fins as the fluid passes from said proximal ends of said dispensing nozzles towards said distal ends of said dispensing nozzles, each of said dispersion plates being supported in a spaced apart relationship from said proximal ends of said dispensing nozzles by at least two brace members;

wherein a gap is formed between each of said swirled fins and said proximal ends of said dispensing nozzles, said gaps being for permitting more equal apportionment of said fluid into said channels formed by said swirled fins;

wherein the inner diameter of said aperture of said proximal end of each of said dispensing nozzles is smaller than the inner diameter of said lumen of each of said threaded male ends of said dispensing nozzles such that a lip is formed around each of said apertures for concentrating the flow of said fluid onto said dispersion plate;

a plurality of U-shaped clamps for engaging said pipes to a stud within said building structure, the U-shaped clamps comprising a resilient rubber for preventing excessive noise from said pipes;

a plurality of U-shaped straps for supporting said pipes horizontally within said walls of said building structure;

a pump fluidly connected to said pipes and fluidly connected to a reservoir, wherein said reservoir contains a pesticide which said pump draws from and dispenses through said pipes out from said plurality of apertures into an interior portion of said walls of said building structure;

a control switch electrically connected to said pump and secured to a stud within said walls of said building structure for controlling said pump; and an indicator light secured within said control switch and electrically connected to said pump for indicating when said pump is in operation.

13. A pest control system for integrating into a building structure comprising, in combination:

a building structure comprising at least one wall, the wall comprising horizontally extending upper and lower members and a plurality of uniformly spaced apart elongate cross members extending between the upper and lower members, each of the cross members having a length being defined between upper and lower ends thereof, each of the cross members having an aperture extending therethrough, each of the apertures being positioned about 9/13 of the length of the cross members from the lower ends of the cross members;

a plurality of interconnected pipes positionable within the wall of the building structure, one of the pipes horizontally extending above the upper member of the wall, a second one of the pipes horizontally extending below the lower member of the wall, a third one of the pipes horizontally extending therethrough the apertures of each of the cross members;

a plurality of apertures projecting into each of said plurality of pipes, said plurality of apertures being, threaded and threadably receiving a corresponding plurality of dispensing nozzles;

each of said dispensing nozzles being generally conically shaped and having an inner surface defining an interior cavity, each of said nozzles having a proximal end and a distal end, each of said proximal ends having an aperture extending therethrough and a threaded male end extending therefrom for coupling with said plurality of apertures and having a lumen extending therethrough;

each of said dispensing nozzles including a plurality of spaced apart swirled fins extending inwardly from said inner surface into said interior cavity for uniformly dispensing a fluid passing from the proximal ends of the dispensing nozzles towards the distal ends of the dispensing nozzles, each of said swirled fins extending between said proximal and distal ends of said dispensing nozzles, a pair of adjacent fins forming a channel therebetween;

each of said dispensing nozzles having a dispersion plate being disposed therein in a spaced apart relationship from said proximal ends of said dispensing nozzles, said dispersion plates being adapted for dispersing a fluid into said channels formed by said swirled fins as the fluid passes from said proximal ends of said dispensing nozzles towards said distal ends of said dispensing nozzles; and a pump fluidly connected to said pipes and fluidly connected to a reservoir, wherein said reservoir contains a pesticide which said pump draws from and dispenses through said pipes out from said plurality of apertures into an interior portion of said walls of said building structure.

\* \* \* \* \*